United States Patent [19]
Eaton

[11] Patent Number: 6,067,741
[45] Date of Patent: May 30, 2000

[54] FISHING ROD AND HANDLE EXTENSION

[76] Inventor: William O. Eaton, 43 Ocala Ct., Selden, N.Y. 11784

[21] Appl. No.: 09/138,026

[22] Filed: Aug. 21, 1998

[51] Int. Cl.[7] .................................................. A01K 87/00
[52] U.S. Cl. ................................................. 43/23; 43/18.1
[58] Field of Search ........................................ 43/18.1, 23

[56] References Cited

U.S. PATENT DOCUMENTS

| D. 116,828 | 9/1939 | McFetridge | 43/23 |
|---|---|---|---|
| D. 128,132 | 7/1941 | Bell | 43/23 |
| 980,942 | 1/1911 | Hanson | 43/23 |
| 2,065,153 | 12/1936 | Proudfit | 43/18.1 |
| 2,559,934 | 7/1951 | Briney | 43/18.1 |
| 3,296,732 | 1/1967 | Magnus | 43/23 |
| 3,372,510 | 3/1968 | Arsenault | 43/23 |
| 3,415,002 | 12/1968 | Schaefer | 43/18.1 |
| 4,651,461 | 3/1987 | Williams | 43/23 |
| 5,231,782 | 8/1993 | Testa | 43/18.1 |
| 5,390,438 | 2/1995 | Warren, Jr. | 43/23 |

FOREIGN PATENT DOCUMENTS

| 75890 | 7/1961 | France | 43/18.1 |

*Primary Examiner*—Michael J. Carone
*Assistant Examiner*—Fredrick T. French, III
*Attorney, Agent, or Firm*—Galgano & Burke

[57] ABSTRACT

A fishing rod handle extension for attachment to the butt end of a fishing rod handle having a generally rectilinear front segment, a generally rectilinear rear segment and an elongated middle segment that is joined at an angle to the front and rear segments with each of the segments lying generally in the same plane. A front segment has a first end for attachment to the butt end of a fishing rod handle.

16 Claims, 5 Drawing Sheets

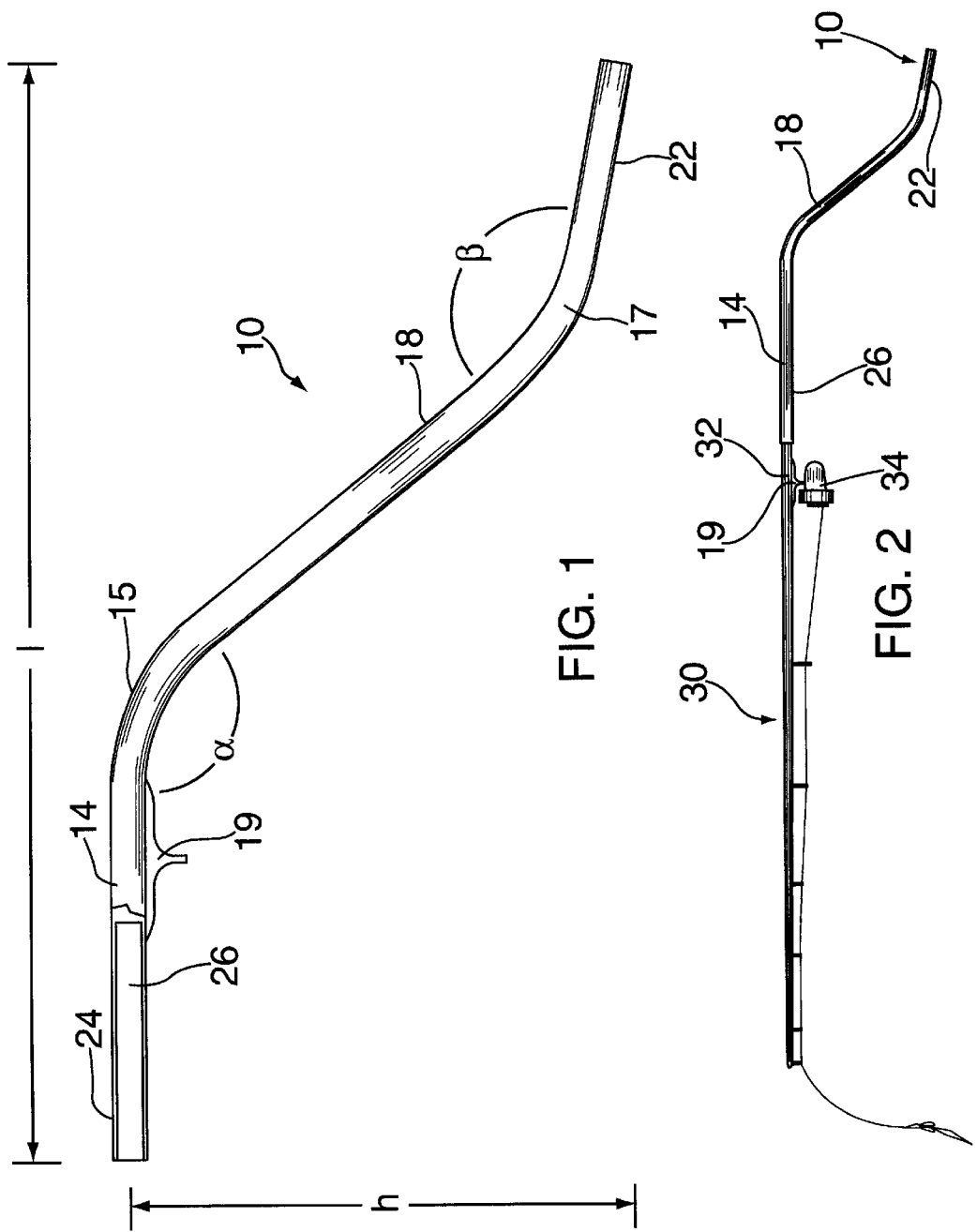

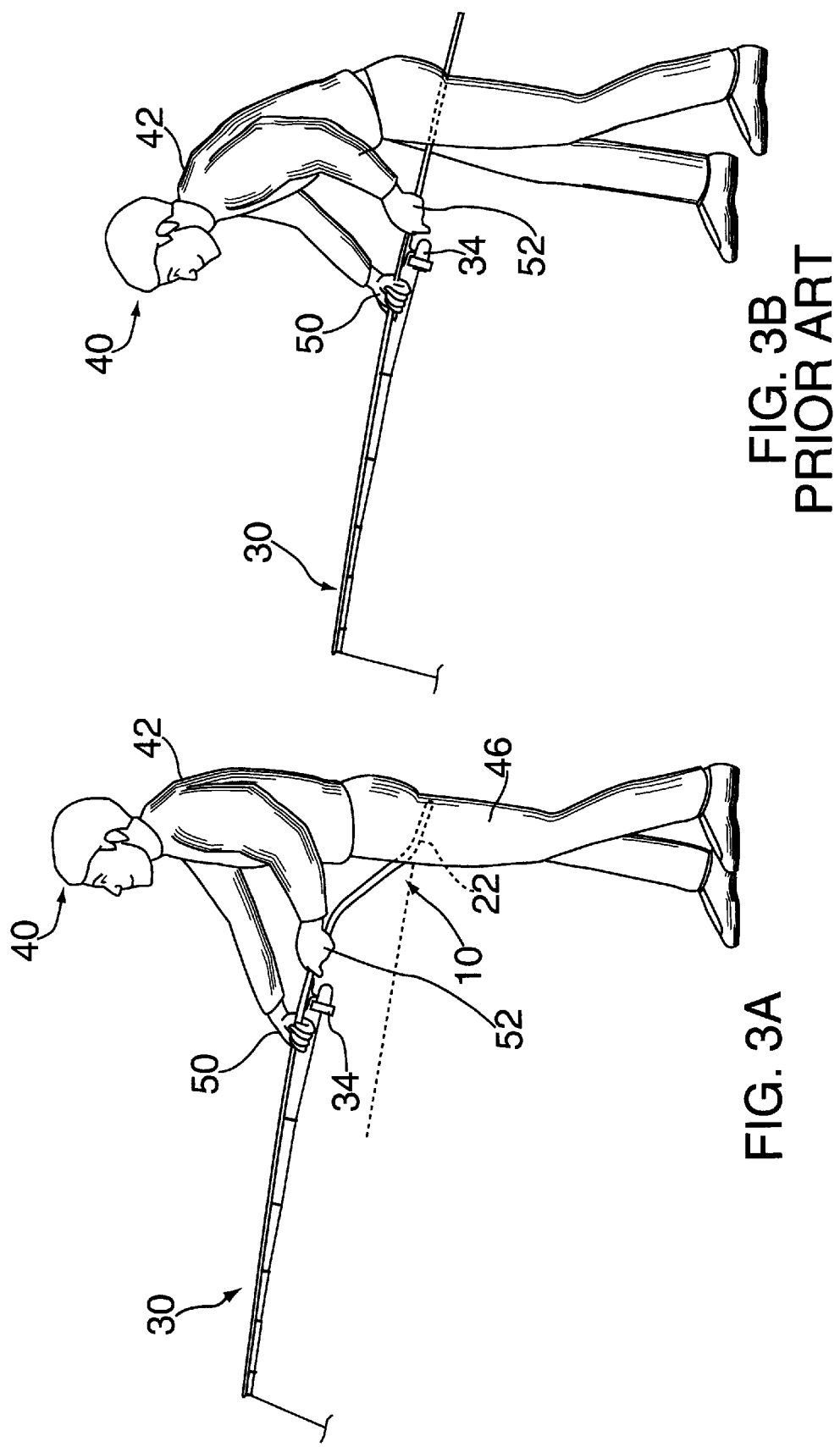

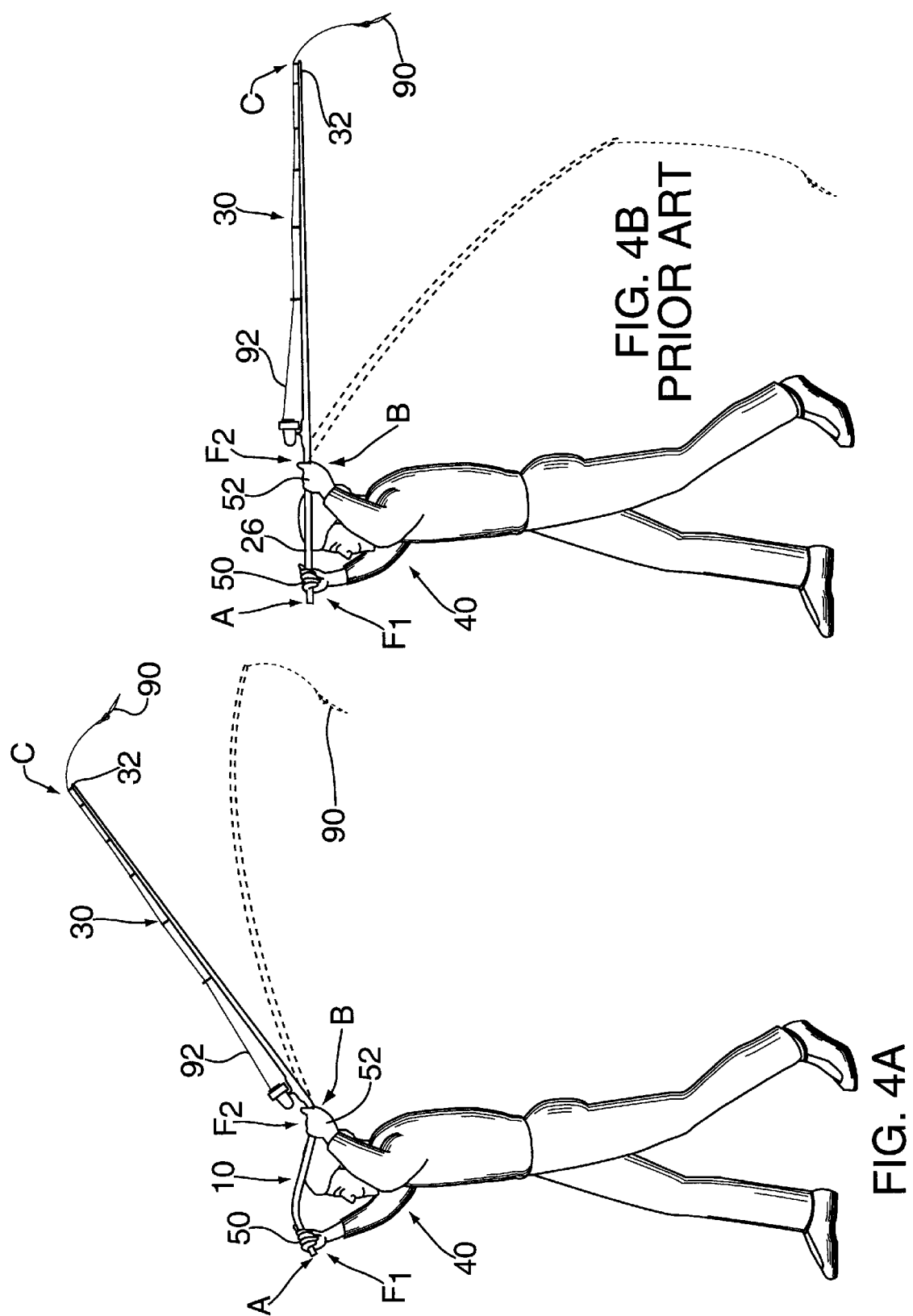

FISHING ROD AND HANDLE EXTENSION

BACKGROUND OF THE INVENTION

1. Field of the Invention

This invention relates generally to fishing rods, and more particularly, to ergonomically designed fishing rod handles and handle extensions for improved casting and angling performance and for reducing physical strain on an angler while fishing.

2. Description of the Prior Art

As those skilled in the art can appreciate, fishing, whether for sport or livelihood, requires a level of skill that is achieved through practice and determination. Therefore, novice anglers experience frustration in casting, reeling and the ability to catch a striking fish. These frustrations experienced by a novice angler are due, in part, to the configuration of a conventional rod having a straight rod and handle.

The straight rod and handle of a fishing or spinning rod results in a very high trajectory when casting, creating a large amount of slack in the line between the rod and the lure or bait, thereby inhibiting distance and accuracy of the cast. In poor weather conditions, such as high winds, problems associated with inaccurate and limited distance casts are multiplied with a high trajectory cast. Veteran anglers may minimize the problems associated with a conventional straight rod handle, but only through much practice.

Another problem associated with a conventional straight fishing rod is the amount of space available for casting. Anglers are often encumbered by the lack of space behind them (often caused by bushes, trees, cliffs, etc.), limiting the rearward motion or backcast (relative to the angler) of the cast. This is particularly cumbersome to novice anglers who often move the rod too far back on the backcast in an effort to gain extra height on the forecast for further casting distance. Further, the novice angler may also bring the fishing rod back to a point where the lure or weight attached to the fishing line will hit the ground, thereby allowing a poor cast at best.

Yet another problem experienced by anglers is lower back strain caused by an angler bending to adequately manipulate the fishing rod and reel when anticipating a strike from a fish. Prolonged periods of fishing in this position may cause a high degree of discomfort on the lower back resulting in pain and stiffening. An angler, almost by reflex, will then compromise their strike angle (discussed infra) to relieve the physical pain in their back, resulting in loss of a striking fish.

Further, when an angler is wading in a body of water, a conventional fishing rod handle configuration positions an attached fishing reel so that the fishing reel is submerged in the water along with the angler's hand. In this situation, the water can be quite cold and result in a level of discomfort to the angler so that he may be forced to poorly position himself while fishing and thereby decrease angling performance.

So far as is known, none of the prior art fishing rods overcome the above-mentioned problems encountered in the art of fishing in a simple and yet highly effective manner as herein proposed.

SUMMARY OF THE INVENTION

Accordingly, it is an object of the present invention to provide an ergonomically designed fishing rod and handle extension for overcoming the above-mentioned problems of a conventional straight fishing rod and handle.

It is also an object of the present invention to provide such a novel fishing rod and handle extension which is simple in design, durable, easy to use and operate and relatively inexpensive., It is a more particular object of the present invention to provide such a novel fishing rod and handle extension which improves casting and angler performance for both the novice and experienced fisherman and which reduces physical strain on the angler when in use.

Certain of the foregoing and related other objects of the present invention are attained by the provision of a fishing rod handle extension for attachment to a fishing rod handle having a generally rectilinear front segment, a generally rectilinear rear segment and an elongated middle segment that is joined at an angle to the front and rear segments with each of the segments lying generally in the same plane. The front segment has a free end for attachment to a fishing rod handle.

Preferably the segments are generally cylindrical and the fishing rod handle extension has a generally S-shaped configuration. Most advantageously, the middle segment is joined at an angle of about 90 to 150 ° with respect to the longitudinal axis of the front and rear segments, and preferably at an angle of about 135 to 140°.

In a preferred embodiment of the invention, the means for attaching comprises friction-fit means for effecting releasable frictional engagement between the free end of the front segment and a butt end of the rod handle. Most desirably, the free end of the front segment is tubular and sized and dimensioned to telescopically receive and frictionally engage the butt end of the rod handle. Alternatively, the handle extension is fixedly attached to the rod handle.

Certain of the foregoing and related objects are also contained in a fishing rod comprising a fishing rod handle having a butt end and a fishing rod handle extension of the type described above.

BRIEF DESCRIPTION OF THE DRAWINGS

In the drawing, wherein similar reference characters denote similar elements through the several views:

FIG. 1 is a side elevational view, in part section, of a fishing rod handle extension embodying the present invention;

FIG. 2 is a side elevational view of a conventional straight fishing spinning rod with a fishing rod handle extension of the present invention attached thereto;

FIGS. 3A and 3B are comparison side perspective views of showing the position of an angler during fishing when using the bent fishing rod handle of the present invention as compared to a straight fishing rod of the prior art;

FIGS. 4A and 4B are comparison side perspective views showing the position of an angler during the backcast when using the bent fishing rod handle of the present invention as compared to a straight fishing rod of the prior art;

DETAILED DESCRIPTION OF THE PREFERRED EMBODIMENT

Figure 5A:
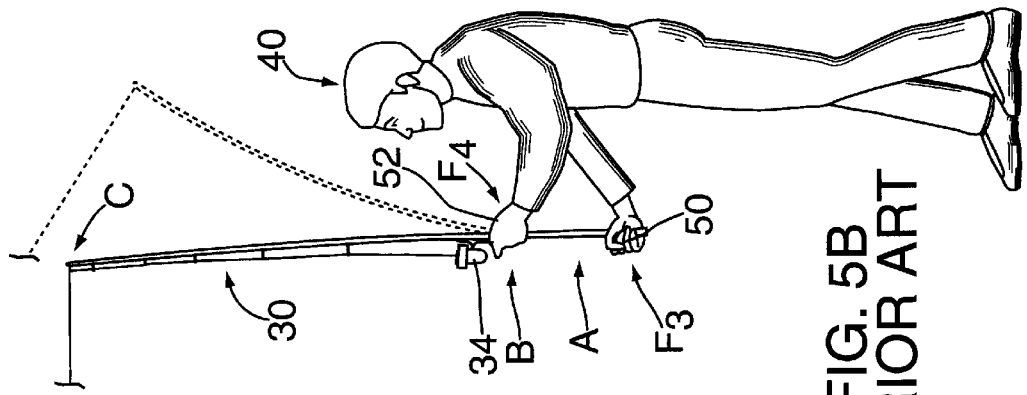
FIGS. 5A and 5B are comparison side perspective views showing the position of an angler during the forecast, when using the bent fishing rod handle of the present invention as compared to a straight fishing rod of the prior art.

Turning now in detail to the appended drawings and in particular FIG. 1 thereof, therein illustrated is a novel fishing rod handle extension embodying the present invention generally designated by reference numeral 10, comprised of at least partially hollow generally rectilinear tubular front segment 14, a generally rectilinear, tubular middle segment 18 and a generally rectilinear rear tubular segment 22 which are joined by arcuate or curved sections 15, 17 respectively. Extension 10 has generally uniform circular cross-section and preferably is cylindrical to match the width and shape of the butt end 32 of a generally cylindrical straight handle of a conventional fishing or spinning rod 30 as shown in FIG. 2. Front segment 14 has a hollow free or first end 24 for receiving butt end 32 of a fishing rod handle. In particular, the hollow free end 24 of front segment 14 is sized and dimensioned to frictionally and telescopically receive the butt end 32 of fishing rod handle 26. In addition, the lower end of front segment 14 is provided with a reel support 19 of conventional design well known to those skilled in the art.

As further shown in FIG. 2, a straight conventional fishing rod 30 has a longitudinal axis which is coaxially aligned with the longitudinal axis of front segment 14 of handle extension 10 to allow for easy sliding of butt end 32 into the cylindrical of free end 24 of front segment 14. The connection can be releasable, such as a friction fit, or it can be permanent, such as by adhesives. of course, a variety of mechanical interlocking devices could be used for either type of releasable or permanent attachment.

Handle extension 10 preferably has a curved S- or Z-shaped configuration. Preferably, segments 14, 15, 17, 18 and 22 of extension 10 are unitary and lie generally in the same plane. Front segment 14 is disposed at angle α with respect to middle segment 18, and rear segment 22 is disposed at an angle β to middle segment 18 as illustrated in FIG. 1. Generally, the segments are disposed at angles of between about 90° and 150° and, most preferably, α=135° and β=140°. As will be discussed in greater detail hereinafter, this novel S-shaped configuration improves angling performance through improved casting, strike angle and reduced physical strain to the angler.

Referring now to FIGS. 3A and 3B, one skilled in the art of fishing will appreciate the increased physical strain placed upon an angler when fishing for long periods of time or fighting a striking fish with a conventional fishing rod. As anglers well know, the most effective strike angle is achieved by keeping the fishing rod-generally parallel to the water line. The optimum strike angle of a fishing rod when anticipating a strike is parallel to the water line so that the strike sweep of the rod covers the most distance possible. Unfortunately, to fish in this position is very uncomfortable on the lower back. Fisherman quickly compromise their strike angle to relieve discomfort. As seen in FIG. 3B, in order to maximize the strike angle with conventional rod 30, angler 40 is forced to bend his upper body 42 over, thereby increasing lower back strain. Continued periods in this position further increase the amount of physical back strain and pain experienced by angler 40.

As shown in FIG. 3A, the rear segment 22 of extension 10 rests between the legs 46 of angler 40 for stability during angling. While angling, extension 10 raises the positional height of reel 34 relative to the butt end of the rod handle extension so that angler 40 may maintain a straight and upright position of upper body 42, thereby relieving lower back strain. Further, the raised height of reel 34 allows angler 40 to maintain rod 30 in a generally parallel relation to the water, thereby maximizing the strike angle of fishing rod 30.

Also, when wading, using a conventional straight fishing rod, the fishing reel and the entire hand are in the water (not shown), which can be quite cold. The present invention based on its curved configuration, as shown in FIG. 3A, raises the height of reel 34 and hands 50 and 52 of angler 40 (as compared to the positional height of the components illustrated in the prior art of FIG. 3B) so that during wading in water when fishing, the fishing reel 34 and hands 50 and 52 are brought above the surface of the water and closer to the angler. This keeps the reel out of the water and, consequently, the angler's hands out of the water as well.

Referring now to FIGS. 4A, 4B, 5A and 5B, angler 40 is shown in a rearward and forward casting motion, respectively. FIG. 4B illustrates a rearward casting motion (referred to as a backcast) using conventional fishing rod 30. Angler 40 performs the backcast, as shown in FIG. 4B, by using an upward pushing force $F_1$ with his right hand 50 at point A (the pivot point) combined with a downward pulling force $F_2$ from his left hand 52 at point B which drives the tip 32 of rod 30 at point C downward. As can be appreciated, novice fisherman inexperienced in casting will cause the bait or lure 90 to hit the ground on the backcast, as shown in phantom line. The configuration of conventional rod 30 and handle 26 does not allow for adequate bending or loading of rod 30 on the backcast, particularly for novice anglers.

The present invention, when used in a similar manner, requires less room on the backcast than a conventional straight handle rod of equal length. This is helpful when wading, on rock jetties, where bushes or other obstacles, can restrict the back cast. With the present, invention, there is also more room for loading or bending the rod on the backcast which helps for farther casting.

As shown in FIG. 4A, angler 40 manipulates extension 10 on the backcast, similar to the casting motion illustrated and described in FIG. 4B. In particular, the right hand 50 of the angler 40 applies an upward pushing force $F_1$ at point A and left hand 52 applies a downward pulling force $F_2$ at point B, resulting in a downward motion of tip 32 of rod 30 at point C. During the backcast, using handle extension 10, the angler's right hand 50 travels a greater pivotal distance (relative to left hand 50 of angler 40 and point B) than the anglers right hand 50 point A in FIG. 4B and, at the same time, increases leverage on the casting motion for increased distance on the cast of lure or bait 90. This overcomes the problem of the prior art where novice fisherman move conventional fishing rod 30 too far back on the backcast in an effort to gain more momentum and increase the distance traveled by the right hand 50 at point A in FIG. 4B and instead cause the lure or bait 90 to hit the ground.

In FIG. 4A, the present invention allows for an increased distance traveled by point A without having point C travel a distance which forces lure or bait 90 to hit the ground on the backcast. Handle extension 10 of the present invention allows for more room on the backcast increasing the bending or loading of conventional fishing rod 30 on the backcast so that angler 40 may gain more momentum for the forecast, the second motion during casting (illustrated in FIGS. 5A and 5B). Further, the increased leverage on the backcast changes the ratio of work between point A and point B resulting in increased acceleration of point C which benefits angler 40 with increased momentum for the subsequent forecast motion.

The second motion of the cast is a forward directed casting movement (referred to as the forecast). FIG. 5B displays a prior art conventional type fishing rod 30 used by angler 40 on the forecast. A problem experienced by many novice anglers using a conventional straight handle fishing rod 30, is that during a forecast, based on the design of the conventional straight fishing rod handle, when a novice angler releases the lure or bait on the forecast, the usual result is a very high casting trajectory, whereby the release point C for lure or bait 90 is directed upward, as shown in FIG. 5B, which prohibits distance and accuracy of the cast of lure or bait 90. This high trajectory is partly due to the straight or rectilinear configuration of conventional fishing rod 30 and its handle. Veteran fisherman minimize this problem through practice.

Figure 5B:
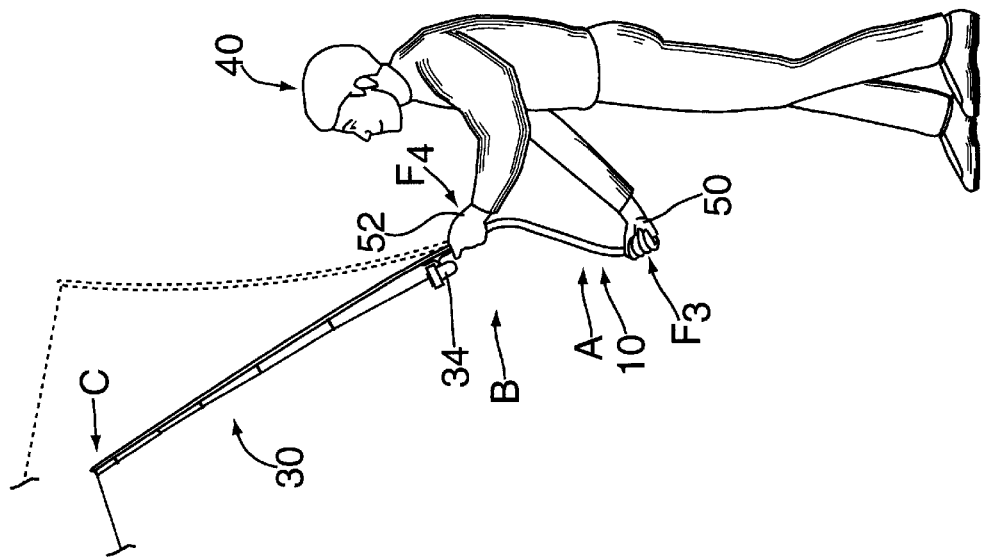

As shown in FIG. 5A, the curved handle extension 10 of the present invention positions rod 30 and point C a greater distance forward on the forecast from upper body 42 of angler 40, as compared to conventional rod 30 and reel 34 illustrated in FIG. 5B. This creates a lower casting trajectory of lure or bait 90 during its casting flight resulting in increased distance and accuracy of the cast.

The high trajectory cast of conventional rod 30, illustrated in FIG. 5B, results in a large amount of fishing line slack between rod 30 and lure or bait 90, inhibiting distance and accuracy of the cast of lure or bait 90. The present invention, by utilizing a lower trajectory reduces the amount of slack in the fishing line and increases distance and accuracy. Further, the lower trajectory lessens inaccuracy and distance problems in poor weather conditions, such as high winds.

In particular, using a conventional rod (FIG. 5B), on the forecast, angler 40 uses right hdnd 50 with a pulling force $F_3$ at point A. At the same time, angler 40 uses left hand 52 with a pushing force $F_4$ at point B. Angler 40 manipulating reel 34 releases the bait or lure 90 at point C resulting in a high trajectory casting arc (not shown). The high trajectory results in a cast with a large amount of slack resulting in poor distance and accuracy on the cast.

On the other hand, as shown in FIG. 5A, using the handle extension 10, angler 40 using right hand 50 with pulling force $F_3$ at point A and left hand 52 with pushing force $F_4$ at point B. As a result, as compared to the prior art as displayed in FIG. 5B, the point of release of lure or bait 90 at C, in FIG. 5A, results in a lower casting trajectory (not shown) and increases distance and improves accuracy of the cast. The point of release with the present invention is between 20 to 60° further forward than the forecast of the conventional rod without changing the body and arm motion of the angler and using a rod of the same length.

Figure 6A:
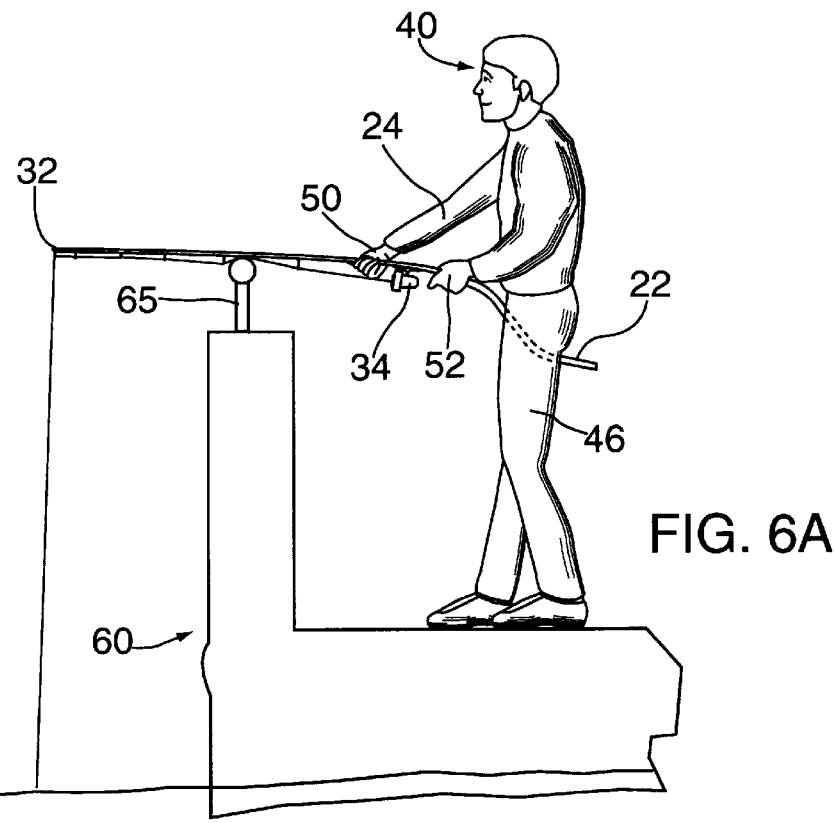
FIGS. 6A and 6B are comparison side perspective views showing the position of the angler fishing over the gunnel of a boat when using a bent fishing rod handle of the present invention as compared to a straight fishing rod of the prior art.
Figure 6B:
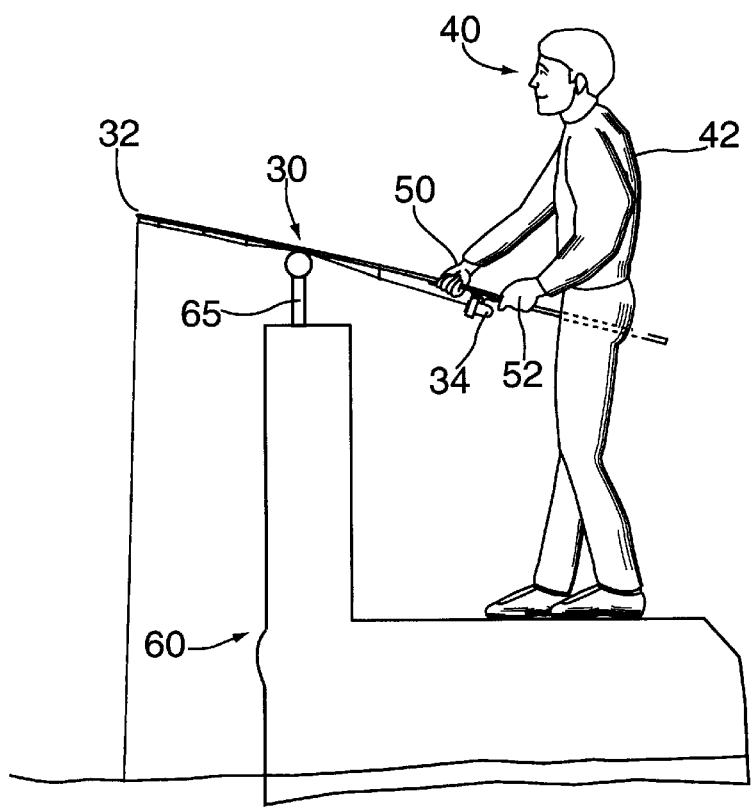

As shown in FIGS. 6A and 6B, when angler 40 is fishing from a boat 60, he may also experience back strain problems in an attempt to achieve the maximum strike angle while fishing over gunnel 65 of boat 60 due to the height of the side of boat 60. As illustrated in FIG. 6B, angler 40 holds conventional fishing rod 30 in his hands 50 and 52. Angler 40 has upper body 42 in an upright and straight standing position. This straight position of angler 40 results in a poor strike angle because his standing position forces hands 50 and 52 to draw rod 30 upward so that the tip 32 of rod 30 is positioned higher than reel 34, thereby significantly limiting the strike angle.

In contrast, as shown in FIG. 6A, extension 10 allows angler 40 to hold rod 30 comfortably in a raised position above gunnel 65. The raised position of rod 30 and reel 34, facilitated by extension 10, allows angler 40 to maintain tip 32 at a lower position than that shown-in FIG. 6B. Consequently, back strain is relieved and strike angle is improved by maintaining a generally parallel relation between fishing rod 30 and the water line (not shown). In addition, it allows the angler to reach over the gunnel further and easier when landing a fish (e.g., the bent butt could be placed in the angler's armpit to facilitate gaffing or netting of the fish.

As can be appreciated from the foregoing the present invention of a curved or bent butt handle allows for increased room for bending or loading of the rod on the backcast. It also allows the rod to be positioned further forward on the forward cast which results in a lower and flatter arc which increases distance and accuracy of a cast and creates less slack in the fishing line between the lure and rod. The design of this bent butt fishing rod handle extension raises the effective height of the fishing reel when in use to a height higher than a conventional fishing rod, thereby bringing the fishing reel closer to the angler resulting it reduced back strain and reduced discomfort in a variety of angling situations. In particular, the added "height" makes it perfect for fishing in boats. It enables the angler to reach over the side of the boat or over the railing for improving the angler's ability for fishing and hooking. In addition, the fishing rod handle extension improves fishing performance by improving the strike angle by keeping the fishing rod parallel to the body of water while raising the height of the fishing reel as a result of the bent configuration of the handle extension.

It will appreciated by those skilled in the art that the present invention of a fishing rod handle extension is of simple construction and is exceptionally durable and easy to use. The extension 10 may be constructed of a wide range of materials which include wood, fiber glass, plastic, metal and the like.

While only one embodiment of the invention has been shown, various modifications may be made as will be understood by those skilled in the art. For example, as shown in FIG. 1, while the handle rod extension preferably has a overall effective length (l) of 16–36 inches and a height (h) of 4–14 inches, the size of the extension can be modified and adapted to the needs of the user and the size and type of rod. A height of 10" and an overall length of 22" was found most effective. In a particularly preferred embodiment, the rectilinear front segment 14 had a length of 5½", the rectilinear middle segment 18 had a length of 6½", the rectilinear rear segment 22 had a length of 4½" and the curved sections 15, 17 joining the front and middle segments and the middle and rear segments, each had a length of about 4½".

While only several embodiments of the present invention have been shown and described, it will be obvious to those persons of ordinary skill in the art, that many changes and modifications may be made thereunto, without departing from the spirit and scope of the invention.

What is claimed is:

1. A fishing rod handle extension for attachment to a butt end of a fishing rod handle comprising:

a generally rectilinear front segment having a first end and means for attaching said first end to said butt end of said fishing rod handle in a generally co-axial relationship therewith;

a generally rectilinear rear segment; and an elongated middle segment joined at an angle to said front and rear segments with each of said segments lying generally in the same plane.

2. A fishing rod handle extension according to claim 1, wherein said segments are generally cylindrical.

3. A fishing rod handle extension according to claim 1, wherein said fishing rod handle extension has a generally S-shaped configuration.

4. A fishing rod handle extension according to claim 1, wherein said middle segment is joined at an angle of about 90 to 150° with respect to the longitudinal axes of said front and rear segments.

5. A fishing rod handle extension according to claim 1, where said angle is about 135–140°.

6. A fishing rod handle extension according to claim 1, wherein said means for attaching comprises releasable friction-fit means for effecting frictional engagement between said first end of said front segment and a butt end of said rod handle.

7. A fishing rod handle extension according to claim 6, wherein said first end of said front segment is tubular and sized and dimensioned to telescopically receive and frictionally engage said butt end of said rod handle.

8. A fishing rod handle extension according to claim 1, wherein said handle extension is fixedly attached to said handle.

9. A fishing rod comprising:
- a fishing rod handle having a butt end and a reel mounted on said handle generally adjacent to said butt end thereof;
- a fishing rod handle extension comprising a generally rectilinear front segment having a first end and means for attaching said first end to said butt end of said fishing rod handle in a generally co-axial relationship therewith.

10. A fishing rod handle extension according to claim 9, wherein said segments are generally cylindrical.

11. A fishing rod handle extension according to claim 9, wherein said fishing rod handle extension has a generally S-shaped configuration.

12. A fishing rod handle extension according to claim 9, wherein said middle segment is joined at an angle of about 90 to 150° with respect to the longitudinal axis of said front and rear segments.

13. A fishing rod handle extension according to claim 9, where said angle is about 135 to 140°.

14. A fishing rod handle extension according to claim 9, wherein said means for attaching comprises friction-fit means for effecting releasable frictional engagement between said first end of said front segment and a butt end of said rod handle.

15. A fishing rod handle extension according to claim 14, wherein said first end of said front segment is tubular and sized and dimensioned to telescopically receive and frictionally engage said butt end of said rod handle.

16. A fishing rod handle extension according to claim 9, wherein said handle extension is fixedly attached to said handle.

* * * * *